United States Patent [19]

Davis

[11] Patent Number: 4,654,802

[45] Date of Patent: Mar. 31, 1987

[54] CEMENT METERING SYSTEM

[75] Inventor: James L. Davis, Marlow, Okla.

[73] Assignee: Halliburton Company, Duncan, Okla.

[21] Appl. No.: 618,850

[22] Filed: Jun. 7, 1984

[51] Int. Cl.$^4$ .................... G05D 11/13; G01N 9/00; B28C 7/04

[52] U.S. Cl. ................................. 364/502; 73/32 R; 137/3; 137/91; 364/558; 366/8; 366/17

[58] Field of Search ............... 364/469, 479, 502, 558, 364/564, 172, 173, 500; 422/132; 137/3, 91; 366/8, 17, 142; 73/32 R

[56] References Cited

U.S. PATENT DOCUMENTS 3,300,193 1/1967 Badgett .............................. 259/154
3,940,600 2/1976 Alexander et al. ............ 235/151.12

FOREIGN PATENT DOCUMENTS 1921681 11/1970 Fed. Rep. of Germany ........ 366/17
7240143 5/1973 France .................................. 137/3

Primary Examiner—Parshotam S. Lall
Assistant Examiner—Daniel W. Juffernbruch
Attorney, Agent, or Firm—William J. Beard

[57] ABSTRACT

For use in preparing cement to cement a well, a cement metering system is set forth. The preferred and illustrated embodiment incorporates flow meters measuring water delivered to a cement jet mixer for cement and water into a slurry. A downstream density meter is included. A second water line dilutes the slurry to adjust the density downwardly to the desired slurry density controlled by the control system. The control system includes a data formatting circuit connected to the various transducers which converts the data so that the density required for the slurry is obtained. As desired, the data can be totalled by integrating over a period of time and shown on the data display. Volume flow rate of the controlled density slurry and bulk volume of dry cement may be determined.

5 Claims, 1 Drawing Figure

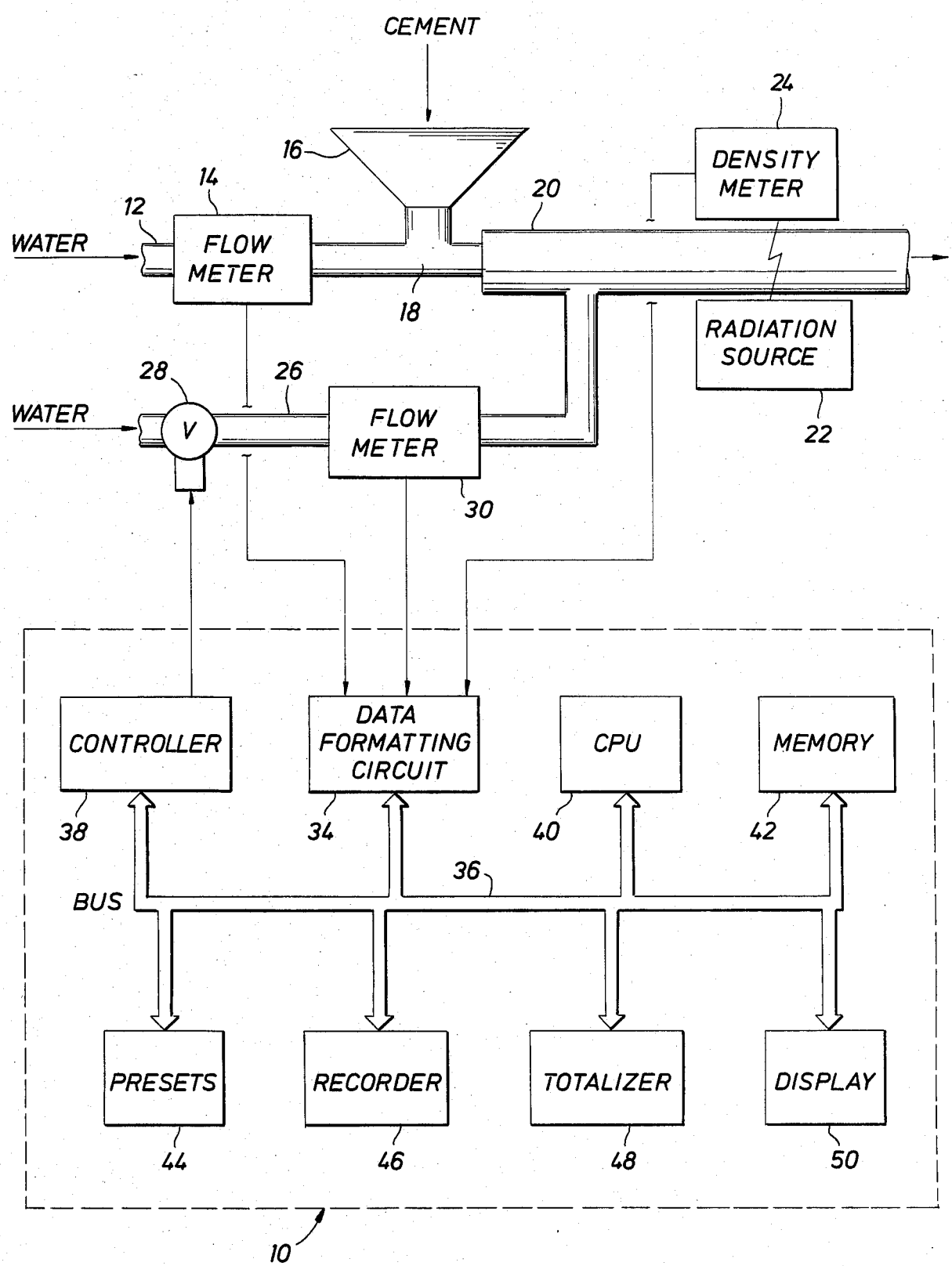

CEMENT METERING SYSTEM

BACKGROUND OF THE DISCLOSURE

In the cementing of a completed well, it is desirable to pump an unset slurry into the annular space on the exterior of casing to protect the well. It is desirable to bond the casing in place to assure that there is no fluid flow in the annular space on the exterior of the casing. This cement prevents contamination of salt water into fresh water artesian strata penetrated by the well. Such communication up and down the well is highly undesirable. For this reason, the well is typically cemented to assure that such leakage does not occur. During the process of cementing, a large supply of cement in dry form is set aside. The dry cement is delivered to a mixer, the mixer being provided with a flow of water. The dry cement is mixed with water and pumped to the well.

The density of the cement must be adjusted from time to time to assure that the cement has the desired properties. When the cement is mixed, it is mixed to a desired density. The density is preferably made somewhat high in this procedure whereby density is subsequently diluted by additional water added to the slurry. The mixing of cement with water to obtain a first density typically exceeds the required slurry density to enable the easier second step to provide dilution thereafter. Dilution is more readily handled by means of a supplemental water liner which adds water. This line is connected through a valve and turbine flow meter to monitor and control the rate of flow. The control system of this disclosure is preferably connected to the flow meter whereby the flow of water can be increased or decreased, perhaps decreasing even to zero, to modify the slurry density to the desired value.

A turbine flow meter in the slurry line cannot be readily maintained. The slurry is abrasive, tending to damage and destroy measuring devices placed in the flow lines conducting slurry to the well. In view of the slurry flow rate, it is difficult to accurately get the needed measurement from the flow line. It is also difficult to measure the dry cement flow rate. Yet, the dry cement flow rate and slurry flow rate are both important and can be obtained by the present apparatus.

The apparatus of this disclosure sets forth a control system collaborating with flow meters for the water and a meter which measures the density of the slurry. A specified density can be targeted; this control system aids and assists in adjusting the density to the desired value.

BRIEF DESCRIPTION OF THE DRAWING

So that the manner in which the above recited features, advantages and objects of the present invention are attained and can be understood in detail, more particular description of the invention, briefly summarized above, may be had by reference to the embodiments thereof which are illustrated in the appended drawing.

It is to be noted, however, that the appended drawings illustrate only typical embodiments of this invention and are therefore not to be considered limiting of its scope, for the invention may admit to other equally effective embodiments.

The only drawing is a schematic block diagram of the cement metering system of this disclosure setting forth a system which cooperates with transducers, the transducers measuring water flow rate and slurry density, and the system including the components which are schematically illustrated in the single drawing in block diagram form.

DETAILED DESCRIPTION OF THE PREFERRED EMBODIMENT

Attention is first directed to the only drawing where the cement mixing apparatus will be described first and thereafter the cement metering system of this disclosure will be set forth. While the numeral 10 identifies the cement metering system of this disclosure, its function is best understood by first describing the cement mixing procedure which is carried out by the apparatus cooperative with the cement metering system 10. A water flow line 12 is connected to a flow meter 14 for measured delivery of water. The volume rate of flow of water is measured by the flow meter 14. This flow meter can be of any form and type but one suitable type of meter is a turbine flow meter wherein a turbine is driven by the flow of water passing through the pipe 12. The numeral 16 identifies a hopper wherein dry cement is delivered into a jet mixer 18. Such a mixer is believed to be well known in the art. The mixer receives the dry particulate cement which is mixed with water and the cement and water form a wet slurry. The slurry is delivered through a larger flow line 20. The flow line incorporates an in-line density measuring system. In the preferred embodiment, a radiation source 22 is located at or near the conduit 20, and radiation passing through the conduit 20 is observed by a suitable detector sensitive to radiation. This is shown in schematic form to be a meter for observing density, and is identified at 24. As will be understood, other types of density meters can be constructed and used and are believed to be well known.

The main water supply is through the line 12. However, there is an additional water flow line 26. It delivers additional water through a valve 28. The metered rate of flow is measured by a flow meter 30. The valve 28 is adjusted in a manner to be described to control the rate at which water flows through the meter 30. This water is supplemental to the water from the line 12; that is, this volume of water is delivered at a flow rate to supplement the water delivered through the main line 12. If the slurry density were precisely controlled, there would be no need to deliver any water through the line 26. However, it is preferable to operate the system so that the slurry is mixed slightly denser than ordinarily required; the density is then diluted to the required density from the supplemental flow of water delivered through the line 26. This flow of water dilutes the slurry to reduce the density. It should be noted that the density of a slurry having a higher proportion of cement is denser than a thin slurry with little cement in it.

The cement metering system 10 has a data formatting circuit 34 which receives inputs from the flow meters 14 and 30 and from the density meter 24. All three of these measuring devices input data to the data formatting circuit 34. This circuit receives input signals on a continuous basis. A suitable sampling rate is selected for the three variables, and the data is preferably converted into multi-bit digital words with a timed sequence suitable for the system. The data formatting circuit accomplishes proper formatting of the data such that the three variables are properly sampled, encoded and formatted for convenient use by the remainder of the apparatus.

The data formatting circuit 34 is connected to a common data bus 36. The bus is also connected to a controller 38. The controller 38 is provided with control signals. These signals are converted into a suitable hydraulic or pneumatic signals for the control valve 28. This valve 28 is preferably pneumatically or hydraulically controlled or operated and is opened or closed to intermediate positions for metering the flow of water through the line 26. This flow of water is metered; the water flow is thus subject to control of the controller 38 and to this end the controller 38 converts the periodically provided digital control words into analog control signals for the control valve 28.

The bus 36 is connected with a CPU 40. The bus also is connected with a suitable memory 42 for storing the control program and to further assist in operation of this system. There are a number of preset inputs 44 which are connected to the bus 36. Selected data is presented to a recorder 46 through the bus, and time integrating totalizers 48 are also included to provide a summation of the total volume of slurry delivered by the cement metering system. In addition, there is a data display 50 which provides a selected variable for display and observation by a user.

The instrument computes the total volume of slurry as well as other variables. The slurry volume is given by Equation (1):

$$V_s = \frac{V_w(\rho_c - \rho_w)}{\rho_c - \rho_s} \quad (1)$$

In the foregoing equation, the following variables are used: where
$V_s$=slurry volume
$V_w$=water volume
$\rho_c$=dry cement density
$\rho_w$=water density
$\rho_s$=measured slurry density Equation (1) is integrated over a period of time from the start of collecting data to the end to obtain total volume. The total volume can be represented as barrels, pounds, metric tons, or other units referring to the total volume of slurry delivered to the well. Moreover, the measured slurry density is observed, periodically sampled and adjusted downwardly whereby additional water is delivered through water supplementation. Consider as an example that the rate of cement delivery to the mixer and the rate of flow of water through the main line is adjusted so that the slurry formed thereby is about 10% too high; in that event, the slurry density is measured or observed downstream of mixing. The supplemental flow of water is added downstream of the mixer to dilute the slurry and reduce its density. As the slurry is reduced in density, such changes in density are measured. By suitable adjustment of the time lag in the operation of the valve by which supplemental water is delivered, the slurry density can be increased or decreased in a timely fashion so that the density is controlled in a stable fashion. The feedback loop is stable and does not go into oscillations provided the rate of change in the closed loop is retarded sufficiently. Moreover, the slurry density is adjusted from the excessive density intentionally obtained from the mixer 18 to the desired density. The output density is monitored by measurement to assure that the required density is achieved for the cement delivered to the well.

The trend of density can be recorded on a strip chart recorder 46. Alternatively, the continual data representing density can be integrated and provided to the totalizer 48. This device can be reset to zero at the start and operated for a specified interval thereby obtaining the integrated sum of the slurry which is delivered to the well. For instance, if slurry is delivered for ten minutes, the water flow rate and density can be used in calculations to thereby obtain the total volume of the slurry delivered. Dry bulk cement volume can be calculated also. This data can be output at the display 50.

While the foregoing is directed to the preferred embodiment, the scope thereof is determined by the claims which follow.

What is claimed is:

1. A method of controlling the finished density as a wet slurry delivered to a well for cementing the well, the method comprising the steps of:
    (a) mixing a first fixed and insufficient flow of water and dry cement to form wet slurry having a density in excess of the desired density for cementing a well wherein the wet slurry flows continuously for delivery to the well;
    (b) adding a variable supplemental flow of water to the wet slurry having the excessive density to reduce the density of the wet slurry;
    (c) measuring the density of the flowing wet slurry after adding the variable supplemental flow of water; and
    (d) controlling the variable supplemental flow of water added to the flowing wet slurry having excessive density to obtain a flowing wet slurry having the desired density for cementing a well.

2. The method of claim 1 including the step of measuring the variable supplemental flow of water, and determining the required supplemental water flow rate required to achieve the desired density of the wet slurry for cementing a well.

3. The method of claim 1 including a preliminary mixing step which mixes the dry cement and the first fixed and insufficient flow of water to form the flowing wet slurry having the excessive density; and
    thereafter mixing the required supplemental water with the flowing wet slurry to achieve the desired density of the wet slurry for cementing the well.

4. The method of claim 3 wherein the step of measuring the density occurs after mixing the required supplemental water with the wet slurry.

5. A method of controlling the finished density of a flowing wet slurry delivered to a well for cementing the well, the method comprising the steps of:
    (a) in a continuous flow mixing apparatus receiving dry cement, the step of mixing a first and insufficient flow of water with the dry cement to form a flow of slurry having a deficiency of water;
    (b) continuously delivering the flow of slurry having a deficiency of water past a measuring device, the measuring device determining the deficiency of water in the flowing wet slurry and forming a signal indicative thereof;
    (c) adding a variable supplemental flow of water to the flowing wet slurry wherein the amount of water is determined by the signal indicative of the deficiency of water; and
    (d) after adding the supplemental flow of water, then delivering the flowing wet slurry with a sufficient measure of water therein to a well for cementing the well.

* * * * *